(12) United States Patent
Palnati et al.

(10) Patent No.: US 11,051,201 B2
(45) Date of Patent: Jun. 29, 2021

(54) DYNAMIC SELECTION OF NETWORK ELEMENTS

(71) Applicant: MICROSOFT TECHNOLGY LICENSING, LLC, Redmond, WA (US)

(72) Inventors: Prasasth Palnati, Westford, MA (US); Girish Nair, Nashua, NH (US); Srinivas Kappla, Nashua, NH (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 33 days.

(21) Appl. No.: 16/280,148

(22) Filed: Feb. 20, 2019

(65) Prior Publication Data
US 2019/0261213 A1 Aug. 22, 2019

Related U.S. Application Data

(60) Provisional application No. 62/632,682, filed on Feb. 20, 2018.

(51) Int. Cl.
*H04W 28/02* (2009.01)
*H04W 36/00* (2009.01)
(Continued)

(52) U.S. Cl.
CPC ... *H04W 28/0273* (2013.01); *H04W 28/0284* (2013.01); *H04W 36/0022* (2013.01);
(Continued)

(58) Field of Classification Search
CPC ............ H04W 28/02; H04W 28/0273; H04W 28/0284; H04W 28/0289; H04W 36/00;
(Continued)

(56) References Cited

U.S. PATENT DOCUMENTS

| 7,346,840 B1 | 3/2008 | Ravishankar et al. |
| 7,466,694 B2 | 12/2008 | Xu et al. |

(Continued)

FOREIGN PATENT DOCUMENTS

| CN | 101093590 A | 12/2007 |
| CN | 102390184 A | 3/2012 |

(Continued)

OTHER PUBLICATIONS

US 10,505,788 B1, 12/2019, Mills et al. (withdrawn)
(Continued)

*Primary Examiner* — Peter Chen
(74) *Attorney, Agent, or Firm* — Ray Quinney & Nebeker; Thomas M. Hardman; Sunah K. Lee

(57) ABSTRACT

In some embodiments, a selection module associated with a control plane node implementing CUPS functionality can identify a user plane element for assigning user plane functionalities based on static and/or dynamic selection criteria. Dynamic criteria can include, for example, load information, latency, and hardware acceleration support. In some embodiments, a control plane node can determine whether to implement a CUPS or a non-CUPS session. If a non-CUPS session is determined, the CUPS control plane node can assume user plane functionalities in addition to control plane functionalities.

18 Claims, 8 Drawing Sheets

(51) Int. Cl.
  *H04W 88/16* (2009.01)
  *H04W 48/18* (2009.01)
  *H04W 76/10* (2018.01)

(52) U.S. Cl.
  CPC .......... *H04W 48/18* (2013.01); *H04W 88/16* (2013.01); *H04W 76/10* (2018.02)

(58) Field of Classification Search
  CPC ......... H04W 36/0005; H04W 36/0011; H04W 36/0016; H04W 33/0022; H04W 36/0027; H04W 33/0033; H04W 36/14; H04W 36/16; H04W 36/18; H04W 76/10; H04W 76/11; H04W 76/12; H04W 76/18; H04W 76/19; H04W 76/27; H04W 74/0833; H04W 88/16; H04W 48/00; H04W 48/18
  See application file for complete search history.

(56) References Cited

U.S. PATENT DOCUMENTS

| | | |
|---|---|---|
| 7,734,746 B2 | 6/2010 | Ng et al. |
| 8,428,610 B2 | 4/2013 | Chowdhury et al. |
| 8,477,730 B2 | 7/2013 | Rajagopalan et al. |
| 8,509,200 B2 | 8/2013 | Li et al. |
| 8,522,241 B1 | 8/2013 | Vohra et al. |
| 8,565,070 B2 | 10/2013 | Harper et al. |
| 8,787,875 B2 | 7/2014 | Ahmed et al. |
| 8,855,051 B2 | 10/2014 | Suh et al. |
| 8,995,262 B2 | 3/2015 | Chowdhury et al. |
| 9,013,993 B2 | 4/2015 | Logan et al. |
| 9,185,595 B2 | 11/2015 | Qu |
| 9,294,981 B2 | 3/2016 | Rajagopalan et al. |
| 9,300,623 B1 | 3/2016 | Earl et al. |
| 9,578,541 B2 | 2/2017 | Seenappa et al. |
| 9,985,875 B1 | 5/2018 | Srinath et al. |
| 10,484,844 B2 | 11/2019 | Sudarsan et al. |
| 10,536,326 B2 | 1/2020 | Mills et al. |
| 2002/0007468 A1 | 1/2002 | Kampe et al. |
| 2002/0023048 A1 | 2/2002 | Buhannic et al. |
| 2002/0062388 A1 | 5/2002 | Ogier et al. |
| 2003/0171114 A1 | 9/2003 | Hastings |
| 2003/0187982 A1 | 10/2003 | Petit |
| 2004/0131023 A1 | 7/2004 | Auterinen |
| 2004/0181538 A1 | 9/2004 | Lo et al. |
| 2004/0193763 A1 | 9/2004 | Iizuka et al. |
| 2004/0267758 A1 | 12/2004 | Katsurashima |
| 2005/0120240 A1 | 6/2005 | Kiwimagi et al. |
| 2005/0136832 A1 | 6/2005 | Spreizer |
| 2006/0008063 A1 | 1/2006 | Harnesk et al. |
| 2006/0013191 A1 | 1/2006 | Kavanagh |
| 2006/0114832 A1 | 6/2006 | Hamilton et al. |
| 2006/0168655 A1 | 7/2006 | Grandmaitre et al. |
| 2006/0195607 A1 | 8/2006 | Naseh et al. |
| 2006/0288404 A1 | 12/2006 | Kirshnan et al. |
| 2006/0294238 A1 | 12/2006 | Naik et al. |
| 2007/0101377 A1 | 5/2007 | Six et al. |
| 2007/0168058 A1 | 7/2007 | Kephart et al. |
| 2007/0297400 A1 | 12/2007 | Cameron et al. |
| 2008/0014961 A1 | 1/2008 | Lipps et al. |
| 2008/0077465 A1 | 3/2008 | Schimpf et al. |
| 2008/0162984 A1 | 7/2008 | Kalra et al. |
| 2008/0240082 A1 | 10/2008 | Feldman et al. |
| 2009/0042537 A1 | 2/2009 | Gelbman et al. |
| 2009/0109845 A1 | 4/2009 | Andreasen et al. |
| 2009/0124284 A1 | 5/2009 | Scherzer et al. |
| 2009/0300173 A1 | 12/2009 | Bakman et al. |
| 2010/0035587 A1 | 2/2010 | Bennett |
| 2010/0050172 A1 | 2/2010 | Ferris |
| 2010/0066804 A1 | 3/2010 | Shoemake et al. |
| 2010/0128708 A1 | 5/2010 | Liu et al. |
| 2010/0188975 A1 | 7/2010 | Raleigh |
| 2010/0238840 A1 | 9/2010 | Lu et al. |
| 2010/0281151 A1 | 11/2010 | Ramankutty et al. |
| 2010/0317331 A1 | 12/2010 | Miller |
| 2011/0131338 A1 | 6/2011 | Hu |
| 2011/0211583 A1 | 9/2011 | Seetharaman et al. |
| 2011/0235505 A1 | 9/2011 | Eswara et al. |
| 2011/0258433 A1 | 10/2011 | Pulini et al. |
| 2011/0269499 A1 | 11/2011 | Vikberg et al. |
| 2011/0296232 A1 | 12/2011 | Izawa |
| 2011/0299386 A1 | 12/2011 | Negoto et al. |
| 2012/0023360 A1 | 1/2012 | Chang et al. |
| 2012/0030349 A1 | 2/2012 | Sugai |
| 2012/0084449 A1 | 4/2012 | Delos Reyes et al. |
| 2012/0106349 A1 | 5/2012 | Adjakple et al. |
| 2012/0131647 A1 | 5/2012 | Lan et al. |
| 2012/0143923 A1 | 6/2012 | Whitney et al. |
| 2012/0144226 A1 | 6/2012 | Yang et al. |
| 2012/0177005 A1 | 7/2012 | Liang et al. |
| 2012/0190331 A1 | 7/2012 | Ahmed et al. |
| 2012/0207104 A1 | 8/2012 | Liang et al. |
| 2012/0236708 A1 | 9/2012 | Kompella et al. |
| 2012/0282937 A1 | 11/2012 | He et al. |
| 2013/0007286 A1 | 1/2013 | Mehta et al. |
| 2013/0010756 A1 | 1/2013 | Liang et al. |
| 2013/0054789 A1 | 2/2013 | Bajamahal |
| 2013/0094395 A1 | 4/2013 | Lopez et al. |
| 2013/0100815 A1 | 4/2013 | Kakadia et al. |
| 2013/0121298 A1 | 5/2013 | Rune et al. |
| 2013/0173804 A1 | 7/2013 | Murthy et al. |
| 2013/0188555 A1 | 7/2013 | Olsson et al. |
| 2013/0212205 A1 | 8/2013 | Flockhart et al. |
| 2013/0231080 A1 | 9/2013 | Cheuk et al. |
| 2013/0286821 A1 | 10/2013 | Liu |
| 2013/0308604 A1 | 11/2013 | Jiang et al. |
| 2014/0047282 A1 | 2/2014 | Deb et al. |
| 2014/0098671 A1 | 4/2014 | Raleigh et al. |
| 2014/0133464 A1 | 5/2014 | Li et al. |
| 2014/0148165 A1 | 5/2014 | Serravalle et al. |
| 2014/0160938 A1 | 6/2014 | Qu |
| 2014/0221025 A1 | 8/2014 | Chandramouli et al. |
| 2014/0241174 A1 | 8/2014 | Harris et al. |
| 2014/0359041 A1 | 12/2014 | Bai |
| 2015/0018131 A1 | 1/2015 | Siefker |
| 2015/0050924 A1 | 2/2015 | Gotou |
| 2015/0181431 A1 | 6/2015 | Zheng et al. |
| 2015/0201364 A1 | 7/2015 | Yamada et al. |
| 2015/0215768 A1 | 7/2015 | Dong et al. |
| 2015/0237539 A1 | 8/2015 | Guo |
| 2015/0271255 A1 | 9/2015 | Mackay et al. |
| 2015/0280927 A1 | 10/2015 | Liang et al. |
| 2015/0334615 A1 | 11/2015 | Zhang et al. |
| 2016/0028607 A1 | 1/2016 | Weill et al. |
| 2016/0029278 A1 | 1/2016 | Poikonen et al. |
| 2016/0135143 A1 | 5/2016 | Won et al. |
| 2016/0270142 A1 | 9/2016 | Olsson et al. |
| 2016/0285923 A1 | 9/2016 | Kodaypak |
| 2016/0286385 A1 | 9/2016 | Ryu et al. |
| 2016/0337841 A1 | 11/2016 | Won et al. |
| 2016/0353325 A1 | 12/2016 | Poikonen |
| 2017/0127324 A1 | 5/2017 | Liang et al. |
| 2017/0142762 A1 | 5/2017 | Kedalagudde et al. |
| 2017/0257810 A1 | 9/2017 | Gandhi |
| 2018/0049156 A1 | 2/2018 | Laha et al. |
| 2018/0077714 A1 | 3/2018 | Kodaypak et al. |
| 2018/0139797 A1 | 5/2018 | Chun et al. |
| 2018/0192234 A1 | 7/2018 | Mohamed et al. |
| 2018/0248711 A1 | 8/2018 | McCann |
| 2018/0270710 A1 | 9/2018 | Hua et al. |
| 2018/0279115 A1 | 9/2018 | Tanna |
| 2018/0332636 A1 | 11/2018 | Lu et al. |
| 2018/0343601 A1 | 11/2018 | Livanos |
| 2018/0368202 A1 | 12/2018 | Landais et al. |
| 2019/0028866 A1 | 1/2019 | Baek et al. |
| 2019/0037441 A1 | 1/2019 | Liu et al. |
| 2019/0313216 A1 | 10/2019 | Wong et al. |
| 2020/0028896 A1 | 1/2020 | Veldanda et al. |

FOREIGN PATENT DOCUMENTS

| | | |
|---|---|---|
| CN | 102555536 A | 7/2012 |
| CN | 202965525 U | 6/2013 |
| CN | 103404181 A | 11/2013 |

(56) References Cited

FOREIGN PATENT DOCUMENTS

| | | |
|---|---|---|
| CN | 203311505 U | 11/2013 |
| CN | 104363572 A | 2/2015 |
| CN | 103348335 B | 7/2016 |
| EP | 1011974 A1 | 6/2000 |
| EP | 2200369 A2 | 6/2010 |
| EP | 2709385 A1 | 3/2014 |
| GB | 2409368 A | 6/2005 |
| JP | 2002-319963 A | 10/2002 |
| JP | 2006-501781 A | 1/2006 |
| JP | 2009-522933 A | 6/2009 |
| JP | 2010-88013 | 4/2010 |
| JP | 2010-141555 A | 6/2010 |
| JP | 2011-508474 A | 3/2011 |
| JP | 2011-259440 A | 12/2011 |
| KR | 10-2010-0070691 A | 6/2010 |
| WO | WO-2004004216 A1 | 1/2004 |
| WO | WO-2007081727 A2 | 7/2007 |
| WO | WO-2009107117 A2 | 9/2009 |
| WO | WO-2010066430 A1 | 6/2010 |
| WO | WO-2013143831 A1 | 10/2013 |
| WO | WO-2013177693 | 12/2013 |
| WO | WO-2016206118 A1 | 12/2016 |
| WO | WO-2017004158 A1 | 1/2017 |
| WO | WO-2017076088 A1 | 5/2017 |
| WO | WO-2017197589 A1 | 11/2017 |
| WO | WO-2018086674 A1 * | 5/2018 ......... H04L 41/5051 |
| WO | WO-2018222838 | 12/2018 |
| WO | WO-2020023511 A1 | 1/2020 |

OTHER PUBLICATIONS

English-translation document of WO-20170760088-A1 (Year: 2017).*
Hakala, H. et al., "Diameter Credit-Control Application", RFC 4006, Network Working Group, Standards Track, http://tools.ietf.org/html/rfc4006, pp. 1-11, 55-57, 69, 71-75, Aug. 2005 (20 pages).
Rodriguez, M. et al., "A 3GPP System Architecture Evolution Virtualized Experimentation Infrastructure for Mobility Prototyping (Invited Paper)", Proceedings of the 4th International Conference on Testbeds and Research Infrastructure for the Development of Networks & Communities (Tridentcom), Mar. 18, 2008 (10 Pages).
Taniguchi, Y. et al., "Implementation and Evaluation of Cooperative Proxy Caching System for Video Streaming Services", Technical Report of the Institute of Electronics Information and Communication Engineers, IEICE, Japan, vol. 103(650):13-18, Feb. 5, 2004—English Abstract (6 pages).
Giust, F. et al., "ETSI: MEC Deployments in 4G and Evolution Towards 5G", ETSI White Paper No. 24, First Edition, ISBN No. 979-10-92620-18-4, Feb. 2018 (24 pages).
3GPP TR 21.905 v13.1.0 (Jun. 2016), "3rd Generation Partnership Project; Technical Specification Group Services and System Aspects; Vocabulary for 3GPP Specifications (Release 13)", Valbonne, France, Jun. 2016 (65 pages).
3GPP TR 21.905 v15.0.0 (Mar. 2018), "3rd Generation Partnership Project; Technical Specification Group Services and System Aspects; Vocabulary for 3GPP Specifications (Release 15)", Valbonne, France, Mar. 2018 (65 pages).
3GPP TR 23.714 v.14.0.0, "3rd Generation Partnership Project; Technical Specification Group Services and System Aspects; Study on Control and User Plane Separation of EPC Nodes (Release 14)"; Valbonne, France, Jun. 2016 (87 pages).
3GPP TR 23.722 v0.1.1 (Apr. 2017), "3rd Generation Partnership Project; Technical Specification Group Services and System Aspects; Study on Common API Framework for 3GPP Northbound APIs (Release 15)", Valbonne, France, Apr. 2017 (20 pages).
3GPP TS 23.040 v13.2.0 (Sep. 2016), "3rd Generation Partnership Project; Technical Specification Group Core Network and Terminals; Technical Realization of the Short Message Service (SMS) (Release 13)", Valbonne, France, Sep. 2016 (214 pages).
3GPP TS 23.204 v13.1.0 (Jun. 2016), "3rd Generation Partnership Project; Technical Specification Group Services and Systems Aspects; Support of Short Message Service (SMS) over Generic 3GPP Internet Protocol (IP) Access; Stage 2 (Release 13)", Valbonne, France, Jun. 2016 (59 pages).
3GPP TS 23.214 v14.5.0, "3rd Generation Partnership Project; Technical Specification Group Services and System Aspects; Architecture enhancements for control and user plane separation of EPC nodes; Stage 2 (Release 14)", Valbonne, France, Dec. 2017 (84 pages).
3GPP TS 23.236 v12.0.0 (Jun. 2013); "3rd Generation Partnership Project; Technical Specification Group Services and System Aspects; Intra-domain connection of Radio Access Network (RAN) nodes to multiple Core Network (CN) nodes (Release 12)", 3GPP Organizational Partners, Valbonne, France, Jun. 2013 (40 pages).
3GPP TS 23.236 v13.0.0 (Jun. 2015); "3rd Generation Partnership Project; Technical Specification Group Services and System Aspects; Intra-domain connection of Radio Access Network (RAN) nodes to multiple Core Network (CN) nodes (Release 13)", 3GPP Organizational Partners, Valbonne, France, Jun. 2015 (41 pages).
3GPP TS 23.401 v13.9.0 (Jun. 2016), "3rd Generation Partnership Project; Technical Specification Group Services and System Aspects; General Packet Radio Service (GPRS) enhancements for Evolved Universal Terrestrial Radio Access Network (E-UTRAN) access (Release 13)", 3GPP Organizational Partners, Valbonne, France, Dec. 2016 (374 pages).
3GPP TS 23.401v13.5.0 (Dec. 2015), "3rd Generation Partnership Project: Technical Specification Group Services and System Aspects; General Packet Radio Service (GPRS) Enhancements for Evolved Universal Terrestrial Radio Access Network (E-UTRAN) Access (Release 13)", 3GPP Organizational Partners, Valbonne France, Dec. 2015 (337 pages).
3GPP TS 23.682 v. 15.5.0 (Jun. 2018), "3rd Generation Partnership Project; Technical Specification Group Services and System Aspects; Architecture Enhancements to Facilitate Communications with Packet Data Networks and Applications (Release 15)", Valbonne, France, Jun. 2018 (125 pages).
3GPP TS 23.682 v.13.11.0 (Jun. 2018); "3rd Generation Partnership Project; Technical Specification Group Services and System Aspects; Architecture Enhancements to Facilitate Communications with Packet Data Networks and Applications (Release 13)"; Valbonne, France, Jun. 2018 (93 pages).
3GPP TS 23.682 v13.9.0 (Jun. 2017), "3rd Generation Partnership Project; Technical Specification Group Services and System Aspect; Architecture enhancements to facilitate communications with packet data networks and applications (Release 13)", Valbonne, France, Jun. 2017 (93 pages).
3GPP TS 23.682 v14.3.0, "3rd Generation Partnership Project; Technical Specification Group Services and System Aspects; Architecture enhancements to facilitate communications with packet data networks and applications (Release 14)", Valbonne, France, Mar. 2017 (106 pages).
3GPP TS 29.128 v13.3.0 (Dec. 2016), "3rd Generation Partnership Project; Technical Specification Group Core Network and Terminals; Mobility Management Entity (MME) and Serving GPRS Support Node (SGSN) Interfaces for Interworking with Packet Data Networks and Applications (Release 13)", Valbonne, France, Dec. 2016 (47 pages).
3GPP TS 29.338 v13.3.0 (Dec. 2016), "3rd Generation Partnership Project; Technical Specification Group Core Network and Terminals; Diameter Based Protocols to Support Short Message Service (SMS) Capable Mobile Management Entities (MMEs) (Release 13)", Valbonne, France, Dec. 2016 (50 pages).
3GPP, "Universal Mobile Telecommunications System (UMTS); Utran Overall Description (3GPP TS 25.401 version 12.0.0 Release 12)", ETSI TS 125 401 v12.0.0 (Oct. 2014); European Telecommunications Standards Institute, Oct. 2014, pp. 1-64 (65 pages—entire document).
Apple, 3GPP Draft, "A Solution of Network Slice Instance Selection and Association", Temporary Document, SA WG2 Meeting #S2-116BIS, S2-165127, Aug. 29-Sep. 2, 2016, Sanya, PR China, Sep. 2016 (5 pages).

(56) References Cited

OTHER PUBLICATIONS

CISCO Systems, "Deployment Guide: CISCO IOS IPSEC High Availability", 2005, accessed http://www.cisco.com/en/US/technologies/tk583/tk372/technologies_white_paper0900aecd80278edf.pdf, retrieved Jul. 26, 2018 (16 pages).
European Extended Search Report issued in EP16882635.2. dated Jul. 17, 2019 (13 pages).
Extended European Search Report issued in European Patent Application No. 12825827.4, dated Mar. 6, 2015 (7 pages).
Extended European Search Report issued in European Patent Application No. 16762501.1, dated Oct. 30, 2018 (11 pages).
Horak, R., Excerpt from "Internet Protocols", in Telecommunications and Data Communications Handbook, John Wiley & Sons, pp. 663-664, Aug. 2007 (2 pages).
International Search Report and Written Opinion issued by the European Patent Office as International Searching Authority in International Application No. PCT/US2018/035345, dated Aug. 13, 2018 (19 pages).
International Search Report and Written Opinion issued by the European Patent Office as International Searching Authority in International Application No. PCT/US2018/031423, dated Oct. 9, 2018 (18 pages).
International Search Report and Written Opinion issued by the European Patent Office as International Searching Authority in International Application No. PCT/US2019/018666, dated Jul. 10, 2019 (26 pages).
International Search Report and Written Opinion issued by the European Patent Office as International Searching Authority, issued in International Application No. PCT/US19/23138, dated May 29, 2019 (16 pages).
International Search Report and Written Opinion issued by the U.S. Patent and Trademark Office as International Searching Authority for International Application No. PCT/US12/21520 dated May 8, 2012 (8 pages).
International Search Report and Written Opinion issued by the U.S. Patent and Trademark Office as International Searching Authority for International Patent Application No. PCT/US16/21744 dated Jun. 9, 2016 (8 pages).
International Search Report and Written Opinion issued by the U.S. Patent and Trademark Office as Searching Authority, issued in International Application PCT/US16/69092, dated Mar. 29, 2017 (15 pages).
International Search Report and Written Opinion issued by the U.S. Patent and Trademark Office as International Searching Authority, received for PCT Patent Application No. PCT/US12/25577, dated May 21, 2012, 7 pages.
International Search Report and Written Report issued by the U.S. Patent and Trademark Office as International Searching Authority, issued in PCT/US17/017913, dated Mar. 13, 2017 (14 pages).
Rodriguez, et al., "A 3GPP System Architecture Evolution Virtualized Experimentation Infrastructure for Mobility Prototyping (Invited Paper)", Proceedings of the 4th International Conference on Testbeds and Research Infrastructure for the Development of Networks & Communities (Tridentcom), Mar. 18, 2008 (10 Pages).
Taniguchi, et al., "Implementation and Evaluation of Cooperative Proxy Caching System for Video Streaming Services", Technical Report of the Institute of Electronics Information and Communication Engineers, IEICE, Japan, vol. 103(650):13-18, Feb. 5, 2004—English Abstract.
International Search Report and Written Opinion as issued by the U.S. Patent and Trademark office as International Search authority, received for PCT Patent Application No. PCT/US2011/055183, dated Mar 8, 2012, 9 pages.
International Search Report and Written Opinion issued by the European Patent Office as International Searching Authority for International Application No. PCT/US19/43037, dated Oct. 29, 2019 (14 pages).

* cited by examiner

| U-Plane 302 | APN 304 | RAT Type 306 | PDN-Type 308 | PLMN ID 310 | Location 312 | Subscription 314 |
|---|---|---|---|---|---|---|
| Sample values | {All, sub.aff, ent1.aff, ent2.aff} | {ALL, UTRAN, EUTRAN, NBIOT } | { ALL, IPV4, NON-IP, IPV6, IPV4V6} | {ALL, MCC1MNC5, MCC2MNC9} | {ALL, LAC123, TAC345} | {ALL, GOLD, SILVER } |
| PGW-U 1 | ALL | ALL | ALL | ALL | ALL | ALL |
| PGW-U 2 | Ent1.aff | EUTRAN | ALL | ALL | ALL | ALL |
| PGW-U 3 | {Sub.aff, ent2.aff } | {UTRAN, EUTRAN} | IPV4V6 | ALL | LAC123 | GOLD |
| PGW-U 4 | ALL | ALL | NON-IP | ALL | ALL | ALL |
| PGW-U 5 | ALL | UTRAN | {IPV4, IPV6} | MCC2MNC9 | ALL | SILVER |

FIG. 3

| U-Plane 402 | Service Capability Support / Load 404 | Latency 406 | HW Acceleration Support 408 |
|---|---|---|---|
| SGW-U 2 | {DATA-30, PROXY-40, VIDEO-20} | {EB1-10, EB2-20, EB3-10} | {ENCRYPTION-40, VIDEO-20} |
| SGW-U 4 | {DATA-80, PROXY-20,} | {EB1-15, EB2-13, EB3-29} | {ENCRYPTION-30} |
| SGW-U 5 | {DATA-60, PROXY-90, VIDEO-20} | {EB1-160, EB2-20, EB3-19} | {ENCRYPTION-10, VIDEO-70} |

FIG. 4

DYNAMIC SELECTION OF NETWORK ELEMENTS

CROSS-REFERENCE TO RELATED APPLICATIONS

This application claims priority to U.S. Provisional Application No. 62/632,682, filed Feb. 20, 2018, which is incorporated herein by reference.

TECHNICAL FIELD

Embodiments of the present invention relate generally to mobile networks, and in particular, to dynamic selection of network elements.

BACKGROUND

In 3GPP, existing network elements such as MME, SGW, and PGW network elements are selected based on the operator configuration selection criteria, which are based on Public Land Mobile Network (PLMN) configuration. Typical selection of a network element is done by using a method (such as round-robin) that takes into account statically known features of the network element. This same selection mechanism has been extended by 3GPP to the selection of User Plane nodes (U-plane nodes) by Control plane nodes (C-plane nodes) as part of the Control User Plane Separation (CUPS) architecture. The same mechanism is also used for selection of User Plane Function (UPF) by Session Management Function (SMF) in 5G architecture.

SUMMARY

In some embodiments, a method includes: storing, in a static information database of a selection module associated with a control plane node, static information associated with a plurality of user plane nodes; periodically receiving, by the selection module, dynamic information associated with the plurality of user plane nodes; storing, by the selection module, the dynamic information associated with the plurality of user plane nodes in a dynamic information database of the selection module; receiving, by the selection module, an indication of a triggering event, the triggering event being associated with at least one user session; identifying, by the selection module, a subset of the plurality of user plane nodes by comparing the static information stored in the static information database with at least one static selection criteria; calculating, by the selection module, a dynamic information score for each of the subset of the plurality of user plane nodes based on the dynamic information stored in the dynamic information database; identifying, by the selection module, a preferred user plane node of the subset of the plurality of user plane nodes based on the calculated dynamic information scores; and providing, by the selection module, the identification of the preferred user plane node to the control plane node such that the control plane node assigns user plane functionality for at least one of the at least one user session to the preferred user plane node.

In some embodiments, the static information comprises one or more of an access point name ("APN"), a radio access technology ("RAT") type, a packet data network ("PDN") type, a location, a serving public land mobile network identifier ("PLMN ID"), or a subscription profile.

In some embodiments, the dynamic information comprises one or more of support service capabilities, service-specific load information, latency information, and hardware acceleration support information.

In some embodiments, the control plane node comprises one or more of a control plane packet gateway (PGW-C), a control plane serving gateway (SGW-C), a control plane traffic detection function (TDF-C), or a control plane module having one or more of a PGW-C, SGW-C or a TDF-C.

In some embodiments, the plurality of user plane nodes comprise one or more of a user plane packet gateway (PGW-U), a user plane serving gateway (SGW-U), a user plane traffic detection function (TDF-U), or a user plane module having one or more of a PGW-U, SGW-U or a TDF-U.

In some embodiments, the static information database and the dynamic information database comprise the same database.

In some embodiments, the triggering event comprises a user equipment connecting to a core network of a network of a networked system.

In some embodiments, the triggering event comprises a loading status of at least one of the plurality of user plane nodes.

In some embodiments, the storing the dynamic information associated with the plurality of user plane nodes in the dynamic information database comprises replacing previously stored information associated with the plurality of user plane nodes in the dynamic information database with the received dynamic information associated with the plurality of user plane nodes.

In some embodiments, the identifying the preferred user plane node comprises identifying the user plane node having the highest or lowest dynamic information score.

In some embodiments, the method further includes assigning, by the control plane node, user plane functionality for at least one of the at least one user session to the preferred user plane node.

In some embodiments, the selection module is part of the control plane node.

In some embodiments, a method includes receiving, by a control plane node of a networked system, a session request for a user equipment; determining, by the control plane node, whether a control and user plane separation (CUPS) session is to be established based on at least one CUPS enablement criteria; if a CUPS session is determined, establishing a user plane session with a user plane node of the networked system; and if a CUPS session is not determined, performing user plane functions by the control plane node for the session.

In some embodiments, the control plane node comprises one or more of a control plane packet gateway (PGW-C), a control plane serving gateway (SGW-C), a control plane traffic detection function (TDF-C), or a control plane module having one or more of a PGW-C, SGW-C or a TDF-C.

In some embodiments, the user plane node comprises one or more of a user plane packet gateway (PGW-U), a user plane serving gateway (SGW-U), a user plane traffic detection function (TDF-U), or a user plane module having one or more of a PGW-U, SGW-U or a TDF-U.

In some embodiments, the one or more CUPS enablement criteria comprise one or more of a service level associated with the user equipment, status as an internet of things ("IoT") session request, or loading information of user plane nodes in the network.

In some embodiments, a system includes: a control plane node; a selection module associated with the control plane node, the selection module including a static information database, a dynamic information database, and a computer readable storage medium having instructions stored thereon to cause a processor to: store, in the static information database of the selection module, static information associated with a plurality of user plane nodes; periodically receive, by the selection module, dynamic information associated with the plurality of user plane nodes; store, by the selection module, the dynamic information associated with the plurality of user plane nodes in the dynamic information database of the selection module; receive, by the selection module, an indication of a triggering event, the triggering event being associated with at least one user session; identify, by the selection module, a subset of the plurality of user plane nodes by comparing the static information stored in the static information database with at least one static selection criteria; calculate, by the selection module, a dynamic information score for each of the subset of the plurality of user plane nodes based on the dynamic information stored in the dynamic information database; identify, by the selection module, a preferred user plane node of the subset of the plurality of user plane nodes based on the calculated dynamic information scores; and provide, by the selection module, the identification of the preferred user plane node to the control plane node such that the control plane node assigns user plane functionality for at least one of the at least one user session to the preferred user plane node.

In some embodiments, the static information comprises one or more of an access point name ("APN"), a radio access technology ("RAT") type, a packet data network ("PDN") type, a location, a serving public land mobile network identifier ("PLMN ID"), or a subscription profile.

In some embodiments, the dynamic information comprises one or more of support service capabilities, service-specific load information, latency information, and hardware acceleration support information.

In some embodiments, the control plane node comprises one or more of a control plane packet gateway (PGW-C), a control plane serving gateway (SGW-C), a control plane traffic detection function (TDF-C), or a control plane module having one or more of a PGW-C, SGW-C or a TDF-C.

In some embodiments, the plurality of user plane nodes comprise one or more of a user plane packet gateway (PGW-U), a user plane serving gateway (SGW-U), a user plane traffic detection function (TDF-U), or a user plane module having one or more of a PGW-U, SGW-U or a TDF-U.

In some embodiments, the static information database and the dynamic information database comprise the same database.

In some embodiments, the triggering event comprises a user equipment connecting to a core network of a network of a networked system.

In some embodiments, the triggering event comprises a loading status of at least one of the plurality of user plane nodes.

In some embodiments, the storing the dynamic information associated with the plurality of user plane nodes in the dynamic information database comprises replacing previously stored information associated with the plurality of user plane nodes in the dynamic information database with the received dynamic information associated with the plurality of user plane nodes.

In some embodiments, the identifying the preferred user plane node comprises identifying the user plane node having the highest or lowest dynamic information score.

In some embodiments, the control plane node is configured to assign user plane functionality for at least one of the at least one user session to the preferred user plane node.

In some embodiments, the selection module is part of the control plane node.

In some embodiments, a system includes: control plane node of a networked system; a computer readable storage medium having instructions stored thereon to cause a processor to: receive, by the control plane node, a session request for a user equipment; determine, by the control plane node, whether a control and user plane separation (CUPS) session is to be established based on at least one CUPS enablement criteria; if a CUPS session is determined, establishing a user plane session with a user plane node of the networked system; and if a CUPS session is not determined, performing user plane functions by the control plane node for the session.

In some embodiments, the control plane node comprises one or more of a control plane packet gateway (PGW-C), a control plane serving gateway (SGW-C), a control plane traffic detection function (TDF-C), or a control plane module having one or more of a PGW-C, SGW-C or a TDF-C.

In some embodiments, the user plane node comprises one or more of a user plane packet gateway (PGW-U), a user plane serving gateway (SGW-U), a user plane traffic detection function (TDF-U), or a user plane module having one or more of a PGW-U, SGW-U or a TDF-U.

In some embodiments, the one or more CUPS enablement criteria comprise one or more of a service level associated with the user equipment, status as an internet of things ("IoT") session request, or loading information of user plane nodes in the network.

BRIEF DESCRIPTION OF FIGURES

Various objectives, features, and advantages of the disclosed subject matter can be more fully appreciated with reference to the following detailed description of the disclosed subject matter when considered in connection with the following drawings, in which like reference numerals identify like elements.

FIG. 3 is a table showing static information, according to some embodiments of the present disclosure.

FIG. 4 is a table showing dynamic information, according to some embodiments of the present disclosure.

DETAILED DESCRIPTION

Embodiments of the systems and methods described herein provide for selection of user plane nodes using both static and dynamic information. As CUPS and 5G become more widely deployed, static methods for choosing user planes have shortcomings because the user planes can be selected more intelligently if additional information is available. Using this information in the selection of the user plane can reduce latencies (improving end-to-end user experience); can distribute load more evenly across the many user planes; take advantage of specific user plane capabilities (for example, proxy functions, network address translation ("NAT," which can be used to translate private IP addresses in the operator network to public IP addresses in the global internet) hardware acceleration etc.).

Figure 1:
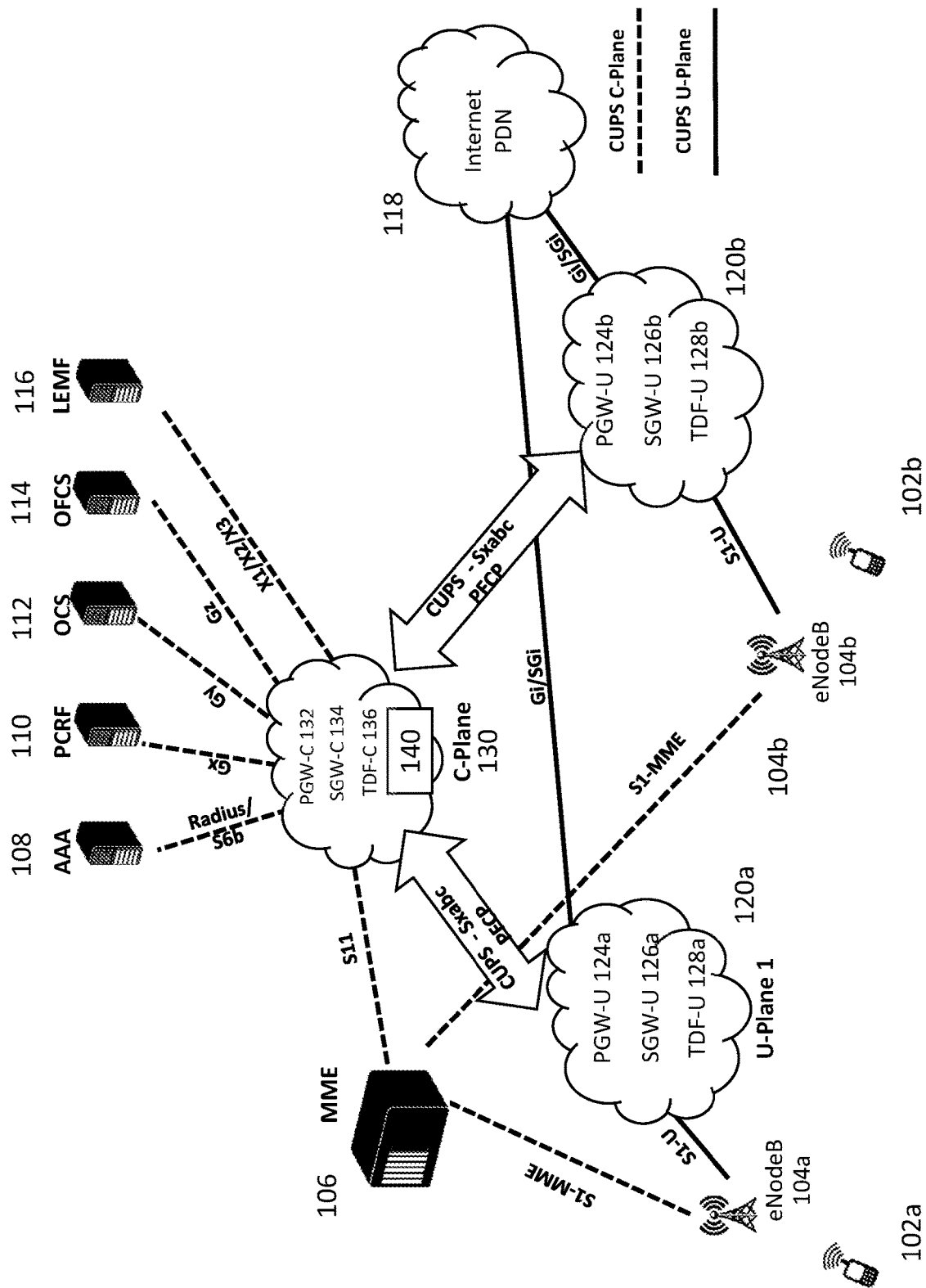
FIG. 1 is a system diagram showing the networked system, according to some embodiments of the present disclosure.

FIG. 1 is a system diagram showing the networked system, according to some embodiments of the present disclosure. FIG. 1 shows user equipment 102a 102b, eNodeB 104a 104b, mobility management entity (MME) 106, authentication, authorization and accounting server (AAA) 108, PCRF 110, online charging system (OCS) 112, offline charging system (OFCS) 114, law enforcement monitoring facility (LEMF) 116, Internet/public data network (PDN) 118, user plane 1 and 2 modules 120a 120b, user plane packet gateway (PGW-U) 124a 124b, user plane serving gateway (SGW-U) 126a 126b, user plane traffic detection function (TDF-U) 128a 128b, control plane module (C-plane) 130, control plane packet gateway (PGW-C) 132, control plane serving gateway (SGW-C) 134, control plane traffic detection function (TDF-C 136), and selection module 140.

UE 102 connects to the networked system through one or more eNodeBs 104a, 104b. UE 102 can comprise one or more computing devices configured to connect to a mobile data network (e.g., mobile phones, tablets, laptops). eNodeB 104a, 104b are the radio part of a cell site. A single eNodeBs 104a, 104b may contain several radio transmitters, receivers, control sections and power supplies.

MME 106 is a signaling entity in the Evolved Packet Core (EPC) connecting eNodeBs to the EPC. AAA 108 interfaces with the PGW-C 132 over the S6b interface. AAA 108 can provide authentication, authorization, and accounting services. PCRF 110 can support installation of rules on the PGW, including support for service data flow detection, policy enforcement and flow-based charging. OCS 112 is an authorization entity which can perform credit management and can grant or reject time or volume credits based on UE subscription policies. OFCS 114 is a node to which the gateway nodes can report UE resource usage. LEMF 116 is a facility that can be designated as a transmission destination for results of interception relating to a particular lawful interception subject. PDN 118 is a network that can relay wireless packets from a mobile user to a server. Control plane and user plane can be separated by CUPS, which is an architecture enhancement of EPC that provides a separation of user plane and control plane functionality for SGW, PGW & TDF. PGW-U 124a 124b is a user plane function of the PGW. The user plane function of the PGW can handle all the packet forwarding and other user plane functions of the PGW as defined in the CUPS architecture, as defined, for example, in 3GPP TS 23.214. SGW-U 126a 126b is a user plane function of the SGW. The user plane function of the SGW handles all the packet forwarding and other user plane functions of the SGW as defined in the CUPS architecture, as defined, for example, in3GPP TS 23.214. TDF-U 128a 128b is a user plane function of the TDF. The user plane function of the TDF handles all the packet forwarding and other user plane functions as defined in the CUPS architecture, as defined, for example, in 3GPP TS 23.214. U-Plane 1 120a can be associated with a location (e.g., Boston, Seattle) where PGW-U 124a, SGW-U 126a and TDF-U 128a instances are co-located. U-Plane 2 120b can be associated with a location (e.g., Boston, Seattle) where PGW-U 124b, SGW-U 126b and TDF-U 128b instances are co-located. As shown in the example of FIG. 1, the u-plane elements are co-located, for example with PGW-U 124a, SGW-U 126a, and TDF-U 128a in the same u-plane 120a data center. In some embodiments, there can be multiple of each type of u-plane elements in the same location (for example, two or more PGW-Us). In some embodiments, the u-plane elements can be separated at different locations.

C-plane module 130 includes a selection module 140, PGW-C 132, SGW-C 134, and TDF-C 136. C-plane module 130 can be associated with a location (e.g., New York) where the -C instances are co-located. In some embodiments, U-Plane 1 120a, U-Plane 2 120b, and C-Plane 130 can be located in the same location or in different locations. When c-plane elements are not collocated, or when desired by a network operator, there can be separate selection modules 140 associated with each c-plane element. For example, the architecture shown in FIG. 1 can be modified to include three separate selection modules, each associated with one of PGW-C 132, SGW-C 134, and TDF-C 136.

As described in more detail below, selection module 140 can include scoring and selection engines for choosing a node in the user plane based on static and dynamic information about the requesting user equipment and network conditions. In some embodiments, c-plane module 130 can include a single selection module 140 in the c-plane 130 for selecting user plane nodes for respective control plane nodes within the c-plane module 130. In some embodiments, network elements, such as the PGW-C 132, SGW-C 134 and TDF-C 136, are implemented as separate nodes in the network and each control plane node includes a selection module 140. The techniques described herein with respect to the selection module 140 are applicable to both an integrated system with multiple nodes combined into a single module, or to a non-integrated system with each network element implemented as a separate node. In some embodiments, integrated systems include multiple or all functions implemented together in a single system, such as a combination of one or more of the PGW-C 132, SGW-C 134 & TDF-C 136 implemented together.

PGW-C 132 is a control plane function of the PGW. The control plane function of the PGW-C 132 can handle all the control path signaling and other control plane functions including selection of the corresponding user plane as defined in the CUPS architecture. SGW-C 134 is a control plane function of the SGW. The control plane function of the SGW-C 134 can handle all the control path signaling and other control plane functions including selection of the corresponding user plane as defined in the CUPS architecture. TDF-C 136 is a control plane function of the TDF. The control plane function of the TDF-C 136 can handle all the control path signaling and other control plane functions including selection of the corresponding user plane as defined in the CUPS architecture, for example, as defined in 3GPP TS 23.214, which illustrates examples in FIG. 4.2.1-1.

In FIG. 1, the dashed lines depict the paths that control traffic between the UE and the core can take. Control traffic helps with the establishment of the control plane session on the C-Plane as well as selection of the user-plane, which establishes the data traffic path. The control protocol(s) (e.g., S1-MME, S11) includes descriptions of the path that the data traffic should take. The solid lines depict the path that data traffic between the UE and a Server in the PDN can take (e.g., 51-U, SGi).

Further, FIG. 1 shows the CUPS protocols (e.g., Sxa, Sxb, Sxc) in use between the -C and -U nodes, according to some embodiments. In the example of FIG. 1, Sxa is the protocol between SGW-C 134 and SGW-U 126*a*, 126*b*, Sxb is the protocol between PGW-C 132 and PGW-U 124*a*, 124*b*, and, Sxc is the protocol between TDF-C 136 and TDF-U 128*a*, 128*b*. These are all protocols that aid in the setup of the -U elements to ensure that the data traffic gets the appropriate treatment and is correctly sent to its destination.

Figure 2:
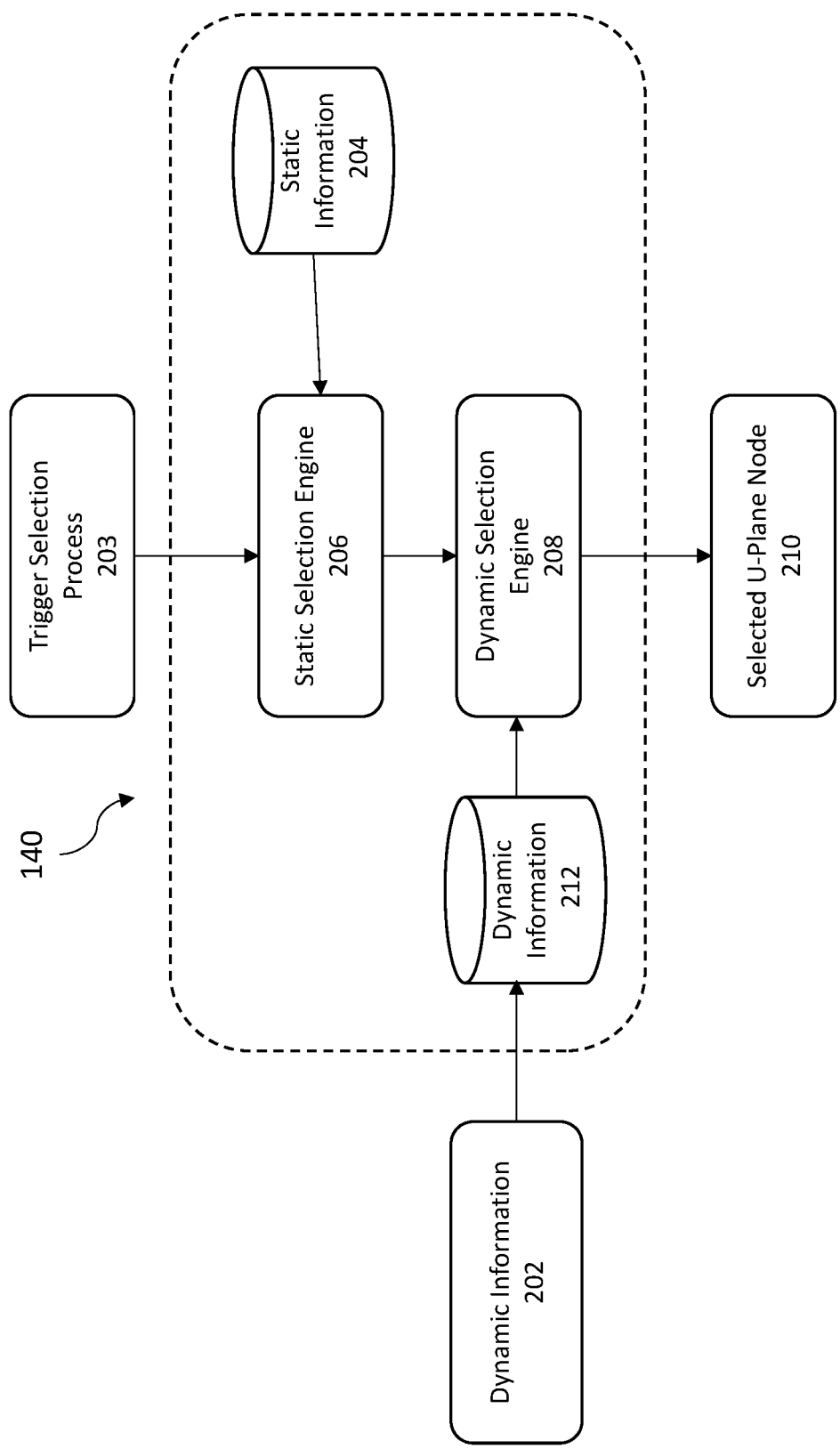
FIG. 2 is a system diagram showing a selection module, according to some embodiments of the present disclosure.

FIG. 2 is a system diagram showing a selection module 140, according to some embodiments of the present disclosure. Selection module 140 includes static selection engine 206, static information database 204, and dynamic selection engine 208. FIG. 2 also shows dynamic information 202, dynamic information database 212 and selected user plane node 210. The trigger to the selection process 203 runs through the selection algorithm. The trigger can be associated with when a UE is connecting to the core network and the core network needs to select the user plane element to facilitate data traffic. In some embodiments, the trigger can be associated with a loading threshold of a u-plane element. As described in more detail below, prior to proceeding with u-plane element selection, the selection module 140 can determine whether a u-plane element collocated with the c-plane element can and/or should be used instead of another u-plane element.

As noted above, selection module 140 can include a static selection engine 206 and a dynamic selection engine 208. Static selection engine 206 receives static information 204 and dynamic selection engine 208 receives dynamic information 202 from each u-plane element. In some embodiments, dynamic information can be received as part of PFCP signaling from the u-plane elements. For example, the standard defined PFCP signaling can be extended to transport dynamic reports from the -U elements to the -C elements. Other methods can be devised outside of PFCP extensions. In one non-PFCP example, a separate protocol can be implemented between the -U elements and the -C elements, which can be, for example, polling based or periodic reporting mechanisms. In some embodiments, dynamic selection engine 208 receives dynamic information from dynamic information database 212. In some embodiments, the same database is used for static and dynamic information. Updates from elements are received periodically and can be stored in dynamic information database until or beyond the start of a selection process. Each iteration of the selection algorithm uses the latest information from the information databases 204 and 212. As described in more detail below, static information is generally associated with a user plane element and is related to parameters (or characteristics) of a user plane element that remain relatively constant (e.g., rarely changing) over the lifetime of the user plane element. Briefly, static information can include access point name (APN), radio access technology (RAT) type, packet data network (PDN) type, location, serving PLMN ID, and subscription profile (e.g., allowed services). Static information 204 can be stored in memory local to the selection engine. Dynamic information is generally associated with a user plane element and is generally associated with characteristics of the user plane element that can fluctuate with time. As described in more detail below, dynamic information can include service capability support, latency, and hardware acceleration support. Without wishing to be bound by theory, dynamic information can be expressed in matrix form, e.g., a service capability support and load matrix (SM), latency matrix (LM), and hardware acceleration support matrix (HAM).

An example SM for a particular user plane element is shown below:

$$\begin{bmatrix} Data & 30 \\ Proxy & 40 \\ Video & 20 \end{bmatrix}$$

In some embodiments, an SM includes information (e.g., load) about supported services such as data, proxy, and video information. In the example above, the SM shows that, for that -U, "Data" service is supported and has a current load of 30% of capacity, "Proxy" service is supported and has a current load is 40% of capacity, and "Video" service is supported and has a current load is 20% of capacity. In some embodiments, measurements is performed by each respective -U element based on the appropriate metric (or, set of metrics) to look at. For example, for capacity of video service used up, the -U element may calculate a function of the processing power remaining, buffer capacity in use, storage in use etc., which can be rolled up into one number or percentage for simplicity. Different implementations may arrive at a different overall indication. For example, some implementations might be very conservative and report higher numbers, while others might be very aggressive and report lower numbers for the same set of metrics.

An example LM for a particular user plane element is shown below:

$$\begin{bmatrix} EB1 & 10 \\ EB2 & 20 \\ EB3 & 10 \end{bmatrix}$$

In some embodiments, an LM includes information (e.g., latency) about enodeBs. The first entry indicates that measured latency to eNodeB EB1 is 10 milliseconds, the second entry indicates that measured latency to eNodeB EB2 is 20 milliseconds, and the third entry indicates that measured latency to eNodeB EB3 is 10 milliseconds. Latency can be measured using any known technique and the selection module 140 be each u-plane element.

An example HAM for a particular user plane element is shown below:

$$\begin{bmatrix} Encryption & 40 \\ Video & 20 \end{bmatrix}$$

In some embodiments, a HAM includes information about services that can be offloaded to hardware. The first entry indicates that encryption via hardware offload is available and 40% of the hardware offload capacity is in use. The second entry indicates that video transcoding via hardware offload is available and the current load is 20% of capacity.

Dynamic selection engine 208 can generate a score based on the dynamic information 202 and/or 212 and static information 204. As described in more detail below, static selection engine 206 can use static information to select a subset of user plane nodes that meet minimum criteria, and then dynamic selection engine 208 uses dynamic information 202 212 to select a particular user plane node from that subset of nodes. Based on the present disclosure, a person having ordinary skill in the art would understand that dynamic selection can be optional, and that a network operator can choose to enable or disable dynamic selection based on network needs. For example, dynamic selection may be disabled during trouble-shooting periods, where efficient loading is not required, or where there are very few u-plane elements to select from.

The subset of nodes (also referred to herein as a candidate set) generated by the static selection engine 206 is transmitted to the dynamic selection engine 208. The dynamic selection engine 208 selects a user plane node 210 from all the candidates based on the dynamic score. In some embodiments, the selection engine chooses a user plane node with the highest or lowest score depending on which scoring function is used. Exemplary scoring functions for which high scoring and low scoring user plane nodes are selected are described in more detail below.

FIG. 3 is a table showing static information, according to some embodiments of the present disclosure. In some embodiments, static information 204 can be stored in a table as shown in FIG. 3. The user plane identifier 302, APN 304, RAT type 306, PDN type 308, PLMN ID 310, location 312 and subscription 314. Some or all of these fields may be used. These fields are merely exemplary, and other types of information is contemplated.

User-plane identifier 302 identifies a particular user plane network element. In the example provided in FIG. 3, user-plane identifier 302 includes an identifier for each of PGW-U 1, PGW-U 2, PGW-U 3, PGW-U 4, and PGW-U 5. Similar entries can be included for SGW-U and TDF-U elements.

APN 304 refers to an access point name associated with the user device or user plane element identified in 302. APN is the access point name which in a mobile network, is similar to a virtual private network that helps connect the UE to the Packet Data network via the PGW. The APN desired by the UE should be supported by the selected PGW-U, hence the APN will also influence the selection of the user plane function. In some embodiments, the APN is specified as part of the Create Session Request the C-Plane 130 receives from MME 106.

RAT type 306 refers to a radio access technology associated with the user device or user plane element identified in 302. Different types of radio technologies include, but are not limited to UTRAN (3G UMTS network), EUTRAN (LTE network), and/or GERAN (2G). RAT/Radio Access Technology type specifies the capability of the UE. For example, the UE (device) can have certain hardware/software capabilities (for example, it can only support UTRAN) that the network should match when selecting a configuration. and thus determines the service that the network can provide to the UE. Based on the RAT type, the network can select a suitable user plane based on pre-configured policy of each respective UE. For example older RAT types may not have a requirement on latency as much as newer RATs.

PDN Type 308 refers to a type of packet data network associated with the user device or user plane element identified in 302. PDN type can be, for example, IPv4, IPv6 or IPV4V6, or Non-IP. The PDN type determines what type of IP address or Non-IP resource need to be allocated to the UE. For example, in some embodiments, the PDN type (IPv4, IPv6, IPv4v6 and Non-IP) can be understood to mean that particular resources have to be allocated for a UE. The IP addresses are typically allocated from IP Address pools which is usually associated with a User Plane. Thus the PDN Type plays a role in determining the user plane Function.

PLMN ID 310 refers to a public land mobile network associated with the user device or user plane element identified in 302. Every mobile service provider may have its own PLMN Identifier, which can consist of, for example, a Mobile Country Code (MCC) and a Mobile Network Code (MNC). The Mobile Country Code and Mobile Network Code are two other characteristics of the UE that can be used to make intelligent user plane selection, since both provide information with regard to the country the UE is registered with as well as the Network Area the UE is currently on.

Location 312 refers to a location associated with the user device or user plane element identified in 302. User device location can be carried (e.g., encoded and transported between network elements) in Location Area Code (LAC), Tracking Area Code (TAC) or Routing Area Identification (RAI) of the signaling messages. The LAC, TAC and RAI provide the location information which can be used to determine the closest (e.g., physically closest, which is generally static) U-Plane function if closest user plane is needed for a particular user to reduce end-to-end latency.

Subscription 314 refers to subscription services that the user plane element identified in 302 can support. Subscription information for the user device could be received by selection module 140 from any external servers like PCRF, AAA, LDAP servers, which typically contain the services that the user device is subscribed to. Some of the services could be, for example, GOLD/SILVER priority-based service, Adult/Child subscription information, proxy service etc. Selection of U-Plane based on Subscription allows the network operator to reserve certain U-Planes for higher paying services like GOLD (for example) thereby guaranteeing the desired level of service. Similarly the service may also determine the latency requirement, for example, by expressing latency requirements for different classes of users (e.g., gold users require less than 10 mn of latency), which is another input into the selection algorithm.

When a UE connects to the network, selection module 140 compares the characteristics of the UE, which can be passed from one network element to another (through standards based protocols), or, looked up via interaction with other network elements (HSS/AAA primarily) using standards based protocols, with characteristics of user plane nodes that are stored in static information database 204. For example, a UE session having an APN of sub.aff, RAT type of UTRAN, PDN-Type of non-IP, PLMN ID of MCC1MNC5, Location of TAC345, and Subscription of Gold would have a PGW-U candidate set including PGW-U 1 and PGW-U 4. PGW-U 2 is not part of the candidate set because PGW-U 2 does not support the APN or RAT type associated with the user session, PGW-U 3 is not part of the candidate set because PGW-U3 does not support the PDN-type or location associated with the user session, and PGW-U 5 is not part of the candidate set because PGW-U 5 does not support the PDN-type, PLMN ID, or subscription associated with the user session.

FIG. 4 is a table showing dynamic information in dynamic information database 212, according to some embodiments of the present disclosure. In some embodiments, dynamic information 202 can be stored in a table in dynamic information database 212 as shown in FIG. 4. The table can include entries for user plane identifier 402, service capability support 404, latency 406, and hardware acceleration support 408 for each u-plane node.

User-plane identifier 402 can identify a particular user plane network element. For each particular -U element, the same user-plane identifier can be used in the tables discussed with reference to FIG. 3 and the table discussed with reference to FIG. 4. In the example provided in FIG. 4, user plane network element identifier 402 includes an identifier for SGW-U 2, SGW-U 4, and SGW-U 5. It should be appreciated that other user plane network element identifiers can include PGW-U 1-5 as discussed with reference to FIG. 3.

Service capability support/load 404 can refer to the different services provided by the network element associated with the user plane element identified in 402. In some embodiments, service capability support/load 404 can be expressed as a service capability support/load matrix (SM). An example service could be providing proxy service, TCP/IP optimization service, page compression service, web content filtering service etc. Supported services are indicated to the selection module 140 as dynamic information 202 by a -U element using many methods. For example, a listing of supported services can be communicated as a bitmap or an explicit naming of supported services etc. For each service, the current load/used capacity metric can also be reported, for example, on a regularly scheduled basis, based on polling, and/or piggy backed with other communications.

Latency 406 refers to packet transfer delays associated with the user plane element identified in 402 to the eNodeBs that it is connected to. In some embodiments, latency 406 can be expressed as a latency matrix (LM). One way to determine latency between the nodes is by using network ping and determine the latency between the nodes. As an example, a value of EB1-10 for SGW-U 2 implies that SGW-U 2 is reporting a 10-millisecond ping round trip time to eNodeB 1. Similarly, latency from SGW-U 2 to other eNodeBs is also reported (example: EB2-20, EB3-10). An alternative method to determine latency between the nodes is to observe the data being received and compute the observed latency in transfer (one-way). Other methods are contemplated. Similar techniques could be used for the PGW-U and/or TDF-U.

Hardware acceleration support 408 can refer to the ability to speed up the computations for certain functions by using dedicated hardware accelerators associated with the user plane element identified in 402. In some embodiments, hardware acceleration support 408 can be expressed as a hardware acceleration support matrix (HAM). Each user plane element can have different types of hardware acceleration. An example hardware acceleration unit could be hardware encryption/decryption service, hardware-based flow offloading, hardware based video conversions etc. For example, ENCRYPTION-40 implies that at SGW-U 2 encryption is supported in hardware and currently 40% of its capacity is in use.

A score (e.g., a suitability metric) of a network node for a particular UE can be computed for all the -U elements in the candidate set determined by static selection engine 206. The score can be a function of the SM, LM, and/or HAM reported by each of the -U elements. In some embodiments, the score is computed by weighting each of the SM, LM, and HAM. In some embodiments, functions can be used by the selection functions. Examples include:

assume that "Set-1" is the Candidate Set; assume that the desired eNodeB is identified based on where the UE accesses the network (e.g., the MME has access to this information and passes it to the other network elements as required. (for example, EB1).

"Max over Set-1" implies computing the function for every element in Set-1 and then pick the one with the Maximum value (with a suitable tie-breaker rule).

f1=Max over Set-1 {1/latency-value (for desired eNodeB)}

At the end of this selection process, f1 identifies the -U element for which the inverse of the latency value reported for the eNodeB of interest is the maximum among all the -U elements in Set-1. In other words, f1 identifies the SGW-U that has the lowest latency value which can help to reduce the end-to-end latency for the data traffic for that UE. For example: if Set-1={SGW-U 2, SGW-U 4} and desired eNodeB is EB1. Then, (from table in FIG. 4), f1=Max (1/10 for SGW-U 2, 1/15 for SGW-U 4)=1/10 for SGW-U 2. In this example, SGW-U 2 is chosen. An alternative is to express this as the Minimum calculation over Set-1.

In another example, f2 can be used where:

f2=Max over Set-1
 {(1/Latency-value (for identified eNodeB)*proxy-available*(100−proxy's current load))}

At the end of this selection process, f2 identifies the -U element for which the computed metric is the maximum. In this example, the computed metric is the product of inverse of the latency value reported for the desired eNodeB, whether the appropriate proxy function is supported by the -U (0=not supported, 1=supported), and, the available capacity on the proxy function. This example is designed to help ensure that the -U picked has support for the proxy function in addition to the lowest latency measure. This can help ensure that the requisite proxy functions are served by a -U that is least loaded, according to an estimation of load, among the alternatives. For example: if, Set-1={SGW-U 2, SGW-U 5}, desired eNodeB is EB1, and proxy service "Video" is required. Then, (from table in FIG. 4), f2=Max ((1/10*1*80%) for SGW-U 2, (1/160*1*80%) for SGW-U 5)=(1/10*1*80%) for SGW-U 2. In this example, SGW-U 2 is chosen.

In another example, f3 can be used where:

f3=Max over Set-1
 {(w1*(100−encryption-capacity-in-use)+w2*encryption-offload-capable)} where w1 and w2 in [0,10] and are configurable, for example, by a network operator.

At the end of this selection process, f3 identifies the -U element for which the computed metric is the maximum. In this example, the computed metric is the product of some configurable weights w1 and w2 in the range 0 to 10 with the hardware offload capability for encryption and the available capacity. In other words, as an example, the -U element selected should allow for encryption offload (by setting w2 high)—this can help ensure that the least end-to-end latency for user data is achieved. In some embodiments, a network node with the highest or lowest score is chosen. For example: say, Set-1={SGW-U 2, SGW-U 5}, desired eNodeB is EB1 and hardware offload for encryption is desired. Assume that w1=10, w2=1. Then, (from table in FIG. 4), f3=Max ((10*60%+1*1) for SGW-U 2, (10*90%+1*1) for SGW-U 5)=(10*90%+1*1) for SGW-U 5. In this example, SGW-U 5 is chosen. In some embodiments, flexibility in selection of an appropriate function definition allows for network operators to custom tailor performance and efficiency criteria to particular sets of UEs. A person having ordinary skill in the art would understand based on the present disclosure that these functions are merely exemplary, and that different functions based on different selection criteria, weighting techniques, etc. could be developed or selected by different network operators based on their particular priorities or network requirements.

According to some embodiments, after the selection process, the selection module 140 can provide information indicative of a preferred U-plane element to the appropriate C-plane element. In some embodiments where the selection module 140 and the C-plane element are separate nodes, the providing can include sending a transmission including the information indicative of the preferred U-plane element to the C-plane element, storing the information indicative of the preferred U-plane element in a database to which the C-plane element has access, or any other method of making such information available to the C-plane element. In some embodiments where the C-plane element and the selection module 140 are part of the same node, the information indicative of the preferred U-plane element can be provided to the C-plane element by making the information indicative of the preferred U-plane element available to a module of the C-plane element that assigns a U-plane element to each session, for example, by storing the information indicative of the preferred U-plane element in a memory of the C-plane element, providing the information indicative of the preferred U-plane element as an input to another processing routine of the C-plane element, or any other method of making such information available to the C-plane element. The C-plane element can then assign the session to the preferred U-plane element.

Figure 5:
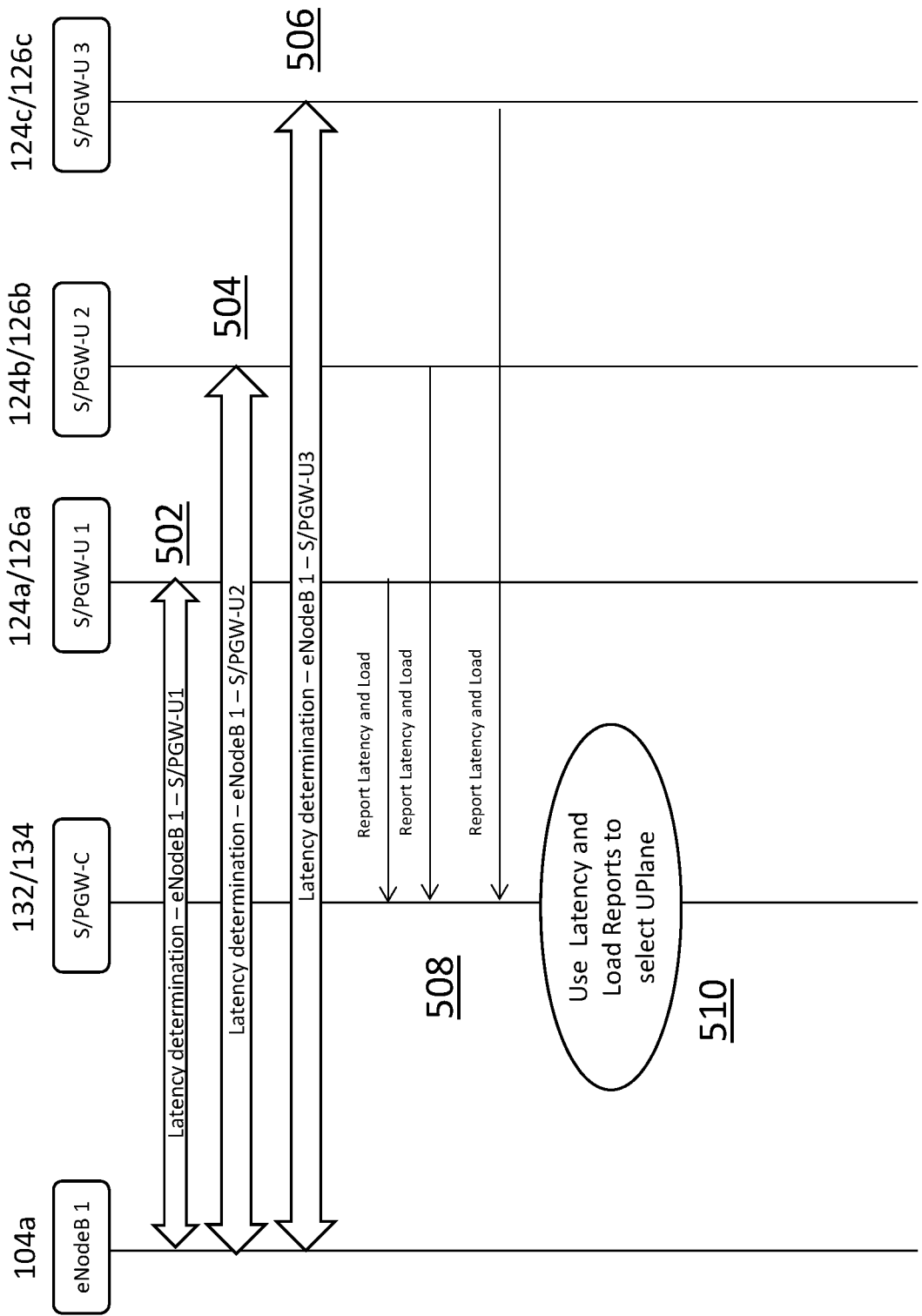
FIG. 5 is a diagram showing a process for generating latency and load reports, according to some embodiments of the present disclosure.

FIG. 5 is a diagram showing a process for generating latency and load reports, according to some embodiments of the present disclosure.

Referring to step 502, S/PGW-U 1 124a/126a determines a latency between itself and eNodeB 1 104a. Latency measurement between nodes can be achieved by number of ways. One such method is using an Internet Control Message Protocol (ICMP) ping utility to calculate a round trip delay (from -U to eNodeB and back).

Referring to step 504, S/PGW-U 2 124b/126b determines a latency between itself and eNodeB 1 104a. Latency measurement between nodes can be achieved by number of ways. One such method is using ICMP ping utility and calculate the round trip delay.

Referring to step 506, S/PGW-U 1 124c/126c determines a latency between itself and eNodeB 1 104a. Latency measurement between nodes can be achieved by number of ways. One such method is using ICMP ping utility and calculate the round trip delay.

Referring to step 508, each of S/PGW-U 1 124a 126a, S/PGW-U 2 124b 126b, and S/PGW-U 1 124c 126c reports the measured latency and load to S/PGW-C 132 134 as dynamic information 202. The load is computed by the -U element as a fraction of available capacity that is in use. In some embodiments, other information other than latency and load can be communicated in the same communication or a different communication and used as dynamic information 202.

Referring to step 510, S/PGW-C 132 134 can use the latency and load reports as one factor for selecting a user plane network node. As described above, other factors can include hardware offload capabilities, proxy capabilities, etc.

Figure 6:
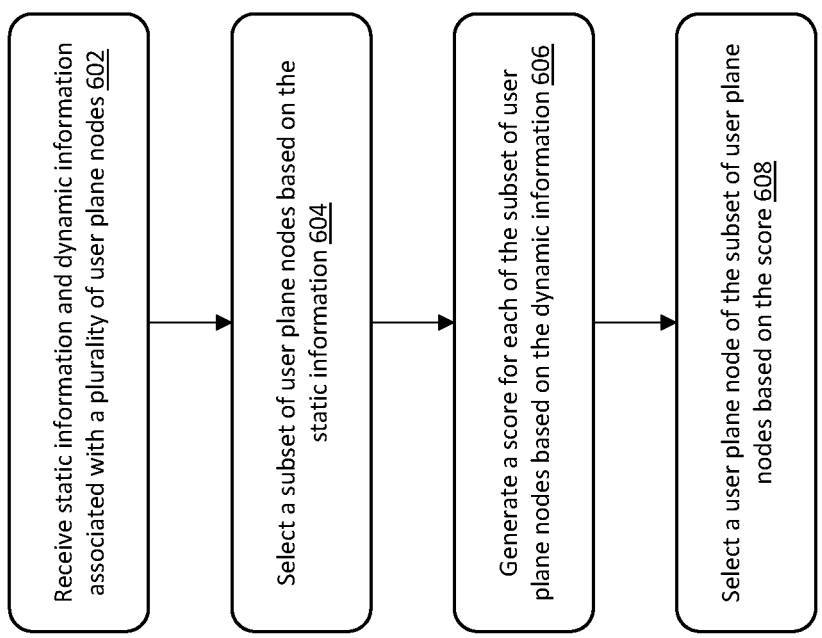
FIG. 6 is a flow chart showing a process for selecting a user plane network node, according to some embodiments of the present disclosure.

FIG. 6 is a flow chart showing a process for selecting a user plane network node, according to some embodiments of the present disclosure.

Referring to step 602, a selection module receives static information and dynamic information associated with a plurality of user plane nodes. This information can be provided, for example, to the selection module from the user plane nodes. As described above, the static information is generally associated with a user plane element and is related to parameters (or characteristics) of a user plane element that remain relatively constant (e.g., rarely changing) over the lifetime of the user plane element and the dynamic information is generally associated with characteristics of the user plane element that can fluctuate with time. In some embodiments, static information is received prior to dynamic information.

Referring to step 604, the selection module selects a subset of user plane nodes based on the static information. As described above, the static information can be used to generate a subset of the user plane nodes that meet the requirements. In some embodiments, one among a subset of nodes can be chosen based on a user plane network element sharing a number of static information characteristics with the user equipment.

Referring to step 606, the selection module generates a score for each of the subset of user plane nodes based on the dynamic information reported by those nodes. As described above, the score can be based on weighting of one more parameters of the dynamic information as described with the example selection functions discussed above. According to some embodiments, more than one of the selection functions described above can be combined others of the selection functions and/or combined with additional selection functions to create more complicated calculations. The particular selection functions disclosed above are merely non-limiting examples.

Referring to step 608, the selection module selects a user plane node of the subset of user plane nodes based on the score. As described above, a user plane network element with either a highest or lowest score can be chosen.

In some embodiments, the triggering event described above can be based on the loading of a u-plane element exceeding a threshold, or becoming overly loaded compared to other u-plane elements. This type of a triggering event can cause a re-balancing of u-plane elements. For example, if it is determined by a SGW-C or a selection module 140 that one of SGW-U 2, SGW-U 4, and SGW-U 5 has become more loaded (or has received an increased capacity) either based on a static threshold or as compared to the other -U elements, the selection module 140 may be triggered again, and can reassign u-plane elements to various sessions associated with the loaded u-plane element. Accordingly, the same or a similar selection process can be used to redistribute u-plane traffic. In some embodiments, this can be performed upon the instantiation of a new u-plane element.

Figure 7:
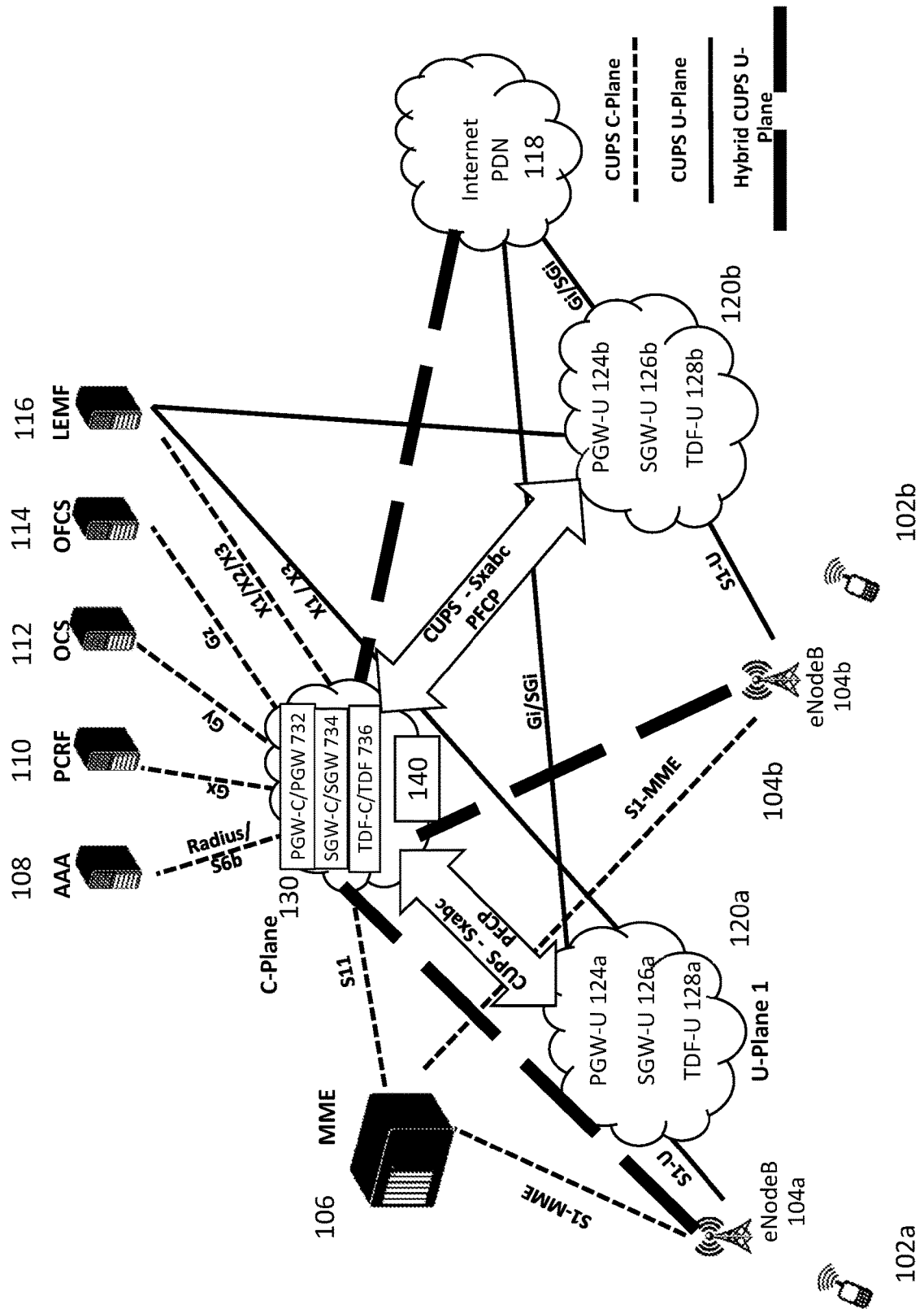
FIG. 7 shows a hybrid CUPS architecture, according to some embodiments of the present disclosure.

FIG. 7 shows a hybrid CUPS architecture, according to some embodiments. The architecture of FIG. 7 is similar to FIG. 1 except that FIG. 7 includes hybrid c-plane elements PGW-C/PGW 732, SGW-C/SGW 734, and TDF-C/TDF 736. The operation of FIG. 7 is similar to that of FIG. 1, except that, as described below, the PGW-C/PGW 732, SGW-C/SGW 734, and/or TDF-C/TDF 736 can perform the functions of both CUPS PGW-C 132, SGW-C 134, and/or TDF-C 136 as well as the non-CUPS functions (i.e., both user plane and control plane functions) of a non-CUPS PGW, SGW, and TDF, respectively. This process is described in more detail with reference to FIG. 8.

Figure 8:
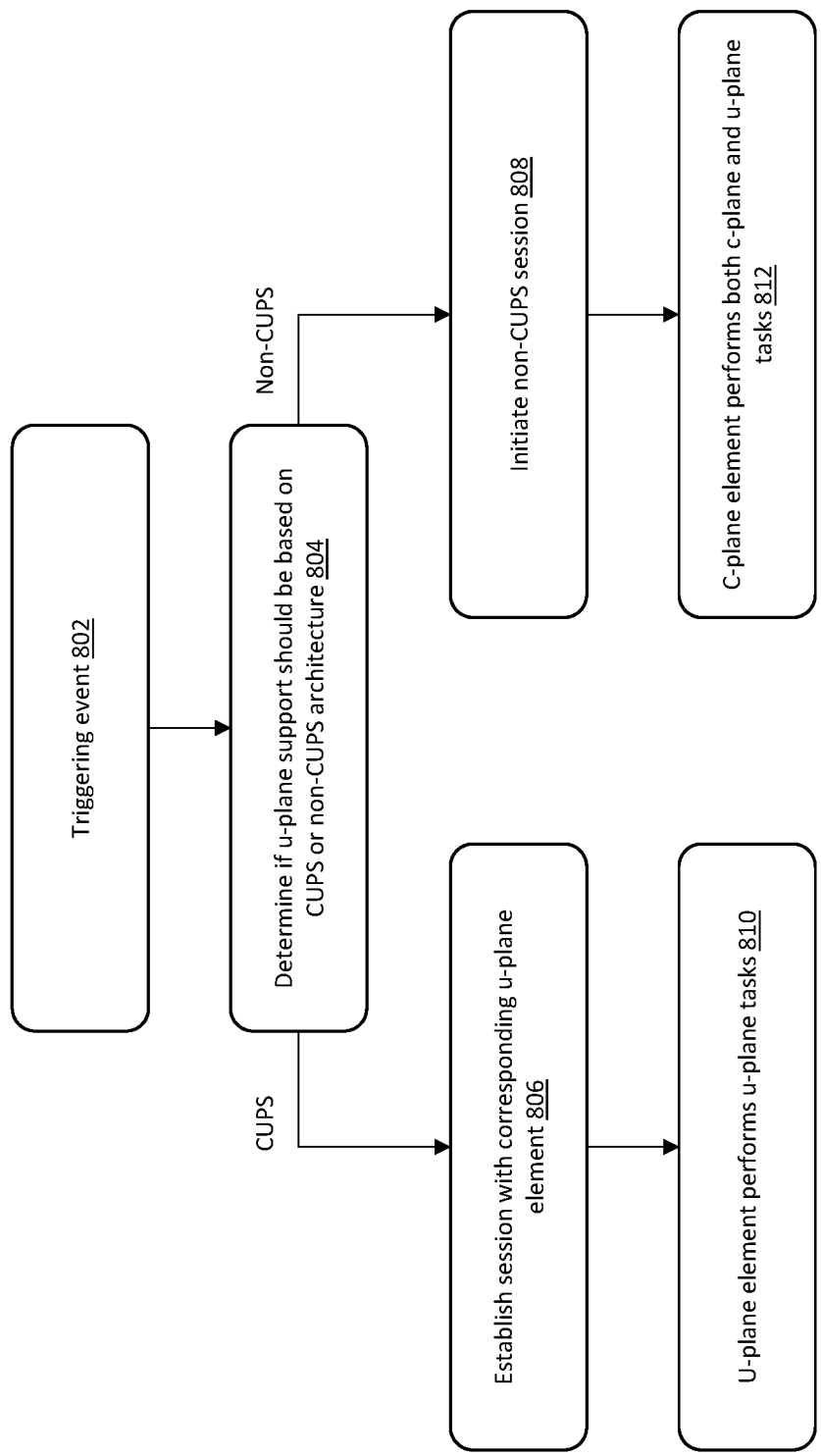
FIG. 8 is a flow chart showing a process for determining whether to initiate a session using CUPS or without CUPS, according to some embodiments of the present disclosure.

FIG. 8 is a flow chart showing the process by which hybrid c-plane elements, such as PGW-C/PGW 732, SGW-C/SGW 734, and TDF-C/TDF 736 establish CUPS or non-CUPS sessions, according to some embodiments. In some embodiments, the process begins at a triggering event 802, such as when a UE is connecting to the core network and the core network needs to select the user plane element to facilitate data traffic (for example, as described above with reference to FIG. 2). After the triggering event 802, at step 804, one or more of the PGW-C/PGW 732, SGW-C/SGW 734, and/or TDF-C/TDF 736 can determine whether a u-plane support should be established with a CUPS session or a non-CUPS session based on one or more CUPS enablement criteria. If it is determined at step 804 that a CUPS session is to be established, the process proceeds to step 806, where the c-plane element establishes a CUPS session with the corresponding u-plane element. For example, with reference to FIG. 7, if PGW-C/PGW 732 determines that CUPS is to be used, PGW-C/PGW 732 may proceed with a CUPS session with one of PGW-U 124*a*, 124*b*. This can be performed after selection module 140 selects a PGW-U. The process proceeds to step 810, where the appropriate u-plane element (in this example, the PGW-U 124*a* or 124*b*) performs the u-plane tasks, such as connecting to the internet via PDN 118.

If instead at step 804 it is determined that a non-CUPS session is to be implemented, the method proceeds to step 808 where a non-CUPS session is initiated. In a non-CUPS session, the c-plane node instead ignore the U-C plane separation provided by CUPS, and instead performs both c- and u-plane functions at step 812. For example, PGW-C/PGW 732 can act like a non-CUPS PGW and establish an appropriate connection with PDN 118 and one of eNodeBs 104*a*, 104*b*. Accordingly, the selection of a corresponding u-plane element, either based on a static or dynamic determination, is not required.

A person having ordinary skill in the art would understand, based on the present disclosure, that a number of different CUPS enablement criteria could be used. Examples include subscriber information, such as the level of service, status as an IoT communication (which may not require a long session with many data packets which thus does not stand to benefit as much from u- and c-plane separation), loading of the u-elements, or any other policies determined by a network operator. In an example, some service levels (e.g., Bronze) are configured not to be able to take advantage of CUPS architecture whereas others (e.g., Silver/Gold) are. In another example, IoT communications do not take advantage of CUPS architecture because they do not frequently require long data sessions and do not require fast user plane services such as data transfer. In another example, high loading of the u-plane elements may cause the control plane elements to begin performing u-plane functions for certain data sessions to reduce the load. Other examples are contemplated, and the above-listed examples are merely exemplary and should not be considered to be limiting.

Systems and methods are described herein for selecting a user plane node. In some embodiments, a computing device receives characteristics of a user session associated with a user device and receives static and dynamic information associated with a plurality of user plane nodes. In some embodiments, the computing device selects a subset of the user plane nodes based on the static information matching user device, processes dynamic information associated with a subset of the plurality of user plane nodes, generates a score for each of the subset of the user plane nodes based on the dynamic information, and selects a user plane node from the subset of user plane nodes based on the score such that data associating with the user session is routed to the selected user plane node.

The subject matter described herein can be implemented in digital electronic circuitry, or in computer software, firmware, or hardware, including the structural means disclosed in this specification and structural equivalents thereof, or in combinations of them. The subject matter described herein can be implemented as one or more computer program products, such as one or more computer programs tangibly embodied in an information carrier (e.g., in a machine readable storage device), or embodied in a propagated signal, for execution by, or to control the operation of, data processing apparatus (e.g., a programmable processor, a computer, or multiple computers). A computer program (also known as a program, software, software application, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file. A program can be stored in a portion of a file that holds other programs or data, in a single file dedicated to the program in question, or in multiple coordinated files (e.g., files that store one or more modules, sub programs, or portions of code). A computer program can be deployed to be executed on one computer or on multiple computers at one site or distributed across multiple sites and interconnected by a communication network.

The processes and logic flows described in this specification, including the method steps of the subject matter described herein, can be performed by one or more programmable processors executing one or more computer programs to perform functions of the subject matter described herein by operating on input data and generating output. The processes and logic flows can also be performed by, and apparatus of the subject matter described herein can be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processor of any kind of digital computer. Generally, a processor will receive instructions and data from a read only memory or a random access memory or both. The essential elements of a computer are a processor for executing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, (e.g., EPROM, EEPROM, and flash memory devices); magnetic disks, (e.g., internal hard disks or removable disks); magneto optical disks; and optical disks (e.g., CD and DVD disks). The processor and the memory can be supplemented by, or incorporated in, special purpose logic circuitry.

To provide for interaction with a user, the subject matter described herein can be implemented on a computer having a display device, e.g., a CRT (cathode ray tube) or LCD (liquid crystal display) monitor, for displaying information to the user and a keyboard and a pointing device, (e.g., a mouse or a trackball), by which the user can provide input to the computer. Other kinds of devices can be used to provide for interaction with a user as well. For example, feedback provided to the user can be any form of sensory feedback, (e.g., visual feedback, auditory feedback, or tactile feedback), and input from the user can be received in any form, including acoustic, speech, or tactile input.

The subject matter described herein can be implemented in a computing system that includes a back end component (e.g., a data server), a middleware component (e.g., an application server), or a front end component (e.g., a client computer having a graphical user interface or a web browser through which a user can interact with an implementation of the subject matter described herein), or any combination of such back end, middleware, and front end components. The components of the system can be interconnected by any form or medium of digital data communication, e.g., a communication network. Examples of communication networks include a local area network ("LAN") and a wide area network ("WAN"), e.g., the Internet.

It is to be understood that the disclosed subject matter is not limited in its application to the details of construction and to the arrangements of the components set forth in the following description or illustrated in the drawings. The disclosed subject matter is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods, and systems for carrying out the several purposes of the disclosed subject matter. It is important, therefore, that the claims be regarded as including such equivalent constructions insofar as they do not depart from the spirit and scope of the disclosed subject matter.

Although the disclosed subject matter has been described and illustrated in the foregoing exemplary embodiments, it is understood that the present disclosure has been made only by way of example, and that numerous changes in the details of implementation of the disclosed subject matter may be made without departing from the spirit and scope of the disclosed subject matter, which is limited only by the claims which follow.

The invention claimed is:

1. A method comprising:
   storing, in a static information database of a selection module associated with a control plane node, static information associated with a plurality of user plane nodes;
   periodically receiving, by the selection module, dynamic information associated with the plurality of user plane nodes, wherein the dynamic information comprises latency information, and wherein the latency information comprises a plurality of measured latency values;
   storing, by the selection module, the dynamic information associated with the plurality of user plane nodes in a dynamic information database of the selection module;
   receiving, by the selection module, an indication of a triggering event, the triggering event being associated with at least one user session;
   identifying, by the selection module, a subset of the plurality of user plane nodes by comparing the static information stored in the static information database with at least one static selection criteria;
   calculating, by the selection module, a dynamic information score for each of the subset of the plurality of user plane nodes, wherein the dynamic information score is calculated based at least in part on the plurality of measured latency values;
   identifying, by the selection module, a preferred user plane node of the subset of the plurality of user plane nodes based on the calculated dynamic information scores; and
   providing, by the selection module, the identification of the preferred user plane node to the control plane node, wherein the control plane node assigns user plane functionality for at least one of the at least one user session to the preferred user plane node.

2. The method of claim 1, wherein the static information comprises one or more of an access point name ("APN"), a radio access technology ("RAT") type, a packet data network ("PDN") type, a location, a serving public land mobile network identifier ("PLMN ID"), or a subscription profile.

3. The method of claim 1, wherein the dynamic information further comprises one or more of support service capabilities, service-specific load information, or hardware acceleration support information.

4. The method of claim 1, wherein the control plane node comprises one or more of a control plane packet gateway (PGW-C), a control plane serving gateway (SGW-C), a control plane traffic detection function (TDF-C), or a control plane module having one or more of a PGW-C, SGW-C or a TDF-C.

5. The method of claim 1, wherein the plurality of user plane nodes comprise one or more of a user plane packet gateway (PGW-U), a user plane serving gateway (SGW-U), a user plane traffic detection function (TDF-U), or a user plane module having one or more of a PGW-U, SGW-U or a TDF-U.

6. The method of claim 1, wherein the static information database and the dynamic information database comprise the same database.

7. The method of claim 1, wherein the triggering event comprises a user equipment connecting to a core network of a network of a networked system.

8. The method of claim 1, wherein the triggering event comprises a loading status of at least one of the plurality of user plane nodes.

9. The method of claim 1, wherein the storing the dynamic information associated with the plurality of user plane nodes in the dynamic information database comprises replacing previously stored information associated with the plurality of user plane nodes in the dynamic information database with the received dynamic information associated with the plurality of user plane nodes.

10. The method of claim 1, wherein the identifying the preferred user plane node comprises identifying a user plane node having a highest dynamic information score or a lowest dynamic information score.

11. The method of claim 1, further comprising assigning, by the control plane node, the user plane functionality for at least one of the at least one user session to the preferred user plane node.

12. The method of claim 1, wherein the selection module is part of the control plane node.

13. The method of claim 1, wherein:
   the method further comprises determining a desired eNodeB based on where a user equipment access a network;
   the plurality of measured latency values comprise a distinct measured latency value for each possible combination of a user plane node in the subset of the plurality of user plane nodes and the desired eNodeB; and
   calculating the dynamic information score comprises determining a lowest latency value among the plurality of measured latency values.

14. The method of claim 1, wherein the dynamic information further comprises support service capabilities, service-specific load information, and hardware acceleration support information.

15. The method of claim 14, wherein calculating the dynamic information score comprises weighting at least one of the support service capabilities, the service-specific load information, the latency information, or the hardware acceleration support information.

16. A system comprising:
   a control plane node;

a selection module associated with the control plane node, the selection module including a static information database, a dynamic information database, and a non-transitory computer readable storage medium having instructions stored thereon to cause a processor to:
store, in the static information database of the selection module, static information associated with a plurality of user plane nodes;
periodically receive, by the selection module, dynamic information associated with the plurality of user plane nodes, wherein the dynamic information comprises latency information, and wherein the latency information comprises a plurality of measured latency values;
store, by the selection module, the dynamic information associated with the plurality of user plane nodes in the dynamic information database of the selection module;
receive, by the selection module, an indication of a triggering event, the triggering event being associated with at least one user session;
identify, by the selection module, a subset of the plurality of user plane nodes by comparing the static information stored in the static information database with at least one static selection criteria;
calculate, by the selection module, a dynamic information score for each of the subset of the plurality of user plane nodes, wherein the dynamic information score is based at least in part on the plurality of measured latency values;
identify, by the selection module, a preferred user plane node of the subset of the plurality of user plane nodes based on the calculated dynamic information scores; and
provide, by the selection module, identification of the preferred user plane node to the control plane node, wherein the control plane node assigns user plane functionality for at least one of the at least one user session to the preferred user plane node.

17. The system of claim 16, wherein the dynamic information further comprises one or more of support service capabilities, service-specific load information, or hardware acceleration support information.

18. The system of claim 16, wherein the control plane node is configured to assign the user plane functionality for at least one of the at least one user session to the preferred user plane node.

* * * * *